May 17, 1938.  G. R. LEWERS  2,117,487
INCINERATION
Filed Oct. 3, 1936  2 Sheets-Sheet 1

INVENTOR
GEORGE R. LEWERS
BY Louis L. Ansart
his ATTORNEY

May 17, 1938. G. R. LEWERS 2,117,487
INCINERATION
Filed Oct. 3, 1936 2 Sheets-Sheet 2

INVENTOR
GEORGE R. LEWERS
BY Louis L. Ansart
his ATTORNEY

UNITED STATES PATENT OFFICE 2,117,487

INCINERATION

George R. Lewers, Brooklyn, N. Y., assignor, by mesne assignments, to Underpinning & Foundation Company, Inc., New York, N. Y., a corporation of New York Application October 3, 1936, Serial No. 103,875

9 Claims. (Cl. 110—12)

The present invention relates to treatment of material involving a preliminary or drying stage in which moisture and volatile constituents are driven off, as by subjecting material to heating and contact with a stream of air, preferably preheated, and a final stage in which the dried material and the gases and vapors from the drying stage are burned substantially completely, thus eliminating noxious odors.

The principal objects of the invention are to provide novel and advantageous and efficient forms of apparatus and processes for effecting treatment of this kind.

While applicable to the treatment of various materials, the present invention is particularly adapted for the disposal and destruction of waste materials such as sewage solids in the form of sludge or screenings having high moisture content, and has for one of its important features, the elimination of odors from the exhaust gases.

In carrying out the invention especially as applied to the disposal of sewage solids, use may be made of a tiered multiple hearth furnace comprising vertically spaced hearths with outlets at the center of one and the periphery of the next lower and vice versa, and rabbling means comprising a hollow shaft and rabbling devices extending therefrom over the hearths and arranged so as to work the material to the outlets of the hearths with which they are associated.

In order to obtain better control of the drying and burning operations, the furnace may be divided by one of the hearths into separate sections, an upper section for drying and a lower section for burning. Obviously the dividing hearth must be provided with means at its outlet adapted to pass the solid material therethrough, but to prevent the flow of gases. By such division of the furnace into sections, it is made possible to dry the material at the most suitable temperatures for reducing the moisture content to a desired extent, thereby tending to eliminate, as much as possible, fluctuation of the furnace temperatures and particularly fluctuation of the temperature of the gases of combustion leaving the burning section of the furnace. The preliminary or drying section renders feasible the introduction of wet materials directly into the furnace without interfering with the operation of the furnace at its highest efficiency.

It should be understood that each of the sections may include either one or a plurality of hearths and corresponding compartments or zones above the hearths.

Heretofore in connection with a drying and burning furnace of the character under consideration, air preheated at a point outside of the furnace has been supplied to the drying section in suitable volume to render the drying operation effective. According to the present invention the air for use in the drying zone may be delivered through the hollow shaft of the rabbling means, being preheated to some extent in its passage upwardly through the lower portion of the furnace. The heat introduced into the drying section by the air thus preheated may be insufficient to evaporate the moisture and drive off the volatile constituents of the material to be dried. To assure the introduction of a suitable amount of heat into the drying section, one or all of the hearths in the drying section and also the top of the furnace may be in the form of hollow drying hearths or trays made of material which is an efficient conductor of heat such as steel, cast iron or other suitable material. Preferably, each of these trays is in the form of an annular hollow chamber and certain walls of the chamber will be provided with radiating fins. All or part of the hot gases from the incinerating or burning section may be passed through the inside of the hollow chambers at the inside of the trays and thence to a waste heater boiler and stack, or to a heat exchanger and then to a stack.

Preferably the hot gases are introduced into the lowermost of the hollow drying trays and then in succession to the one or more other drying trays being finally discharged to the outside of the furnace. The hot material passing downwardly from a drying section is deposited on the upper hearth in the burning section and is worked back and forth on the hearths in the burning section and eventually discharged therefrom. Under some conditions the temperature of the gases entering the drying trays may become excessive. To avoid this the flue leading the burning gases to the hollow hearths may be provided with an air damper whereby the temperature of the gases entering the drying trays may be kept from becoming excessive. After the air introduced into the preheater has absorbed the moisture and volatile materials freed by the heat supplied from the hollow hearths it is passed to the burning section, preferably to the lower part thereof, and passed over the ash and drying material before passing out of the burning section directly to a stack or through a waste heat boiler, a heat exchanger or any other heat saving device.

Either one or both of the flues leading from the burning section to the hollow hearths or leading from the burning section to the stack may be provided with heat exchangers from which preheated air may be supplied to the hollow rotating tube of the rabbling means or to the drying section, preferably above the uppermost hearth in said section. In either the drying section or the burning section the gases may pass concurrently with or countercurrently to the solids being treated or may be passed through only one zone. Also the uppermost zone or compartment of the burning section may have but one opening for inflow and outflow of gas and that opening at the bottom of the compartment thus causing gas flow both concurrent with and countercurrent to the flow of solids.

Other objects, features and advantages will appear upon consideration of the following description and of the drawings in which.

Figure 1:
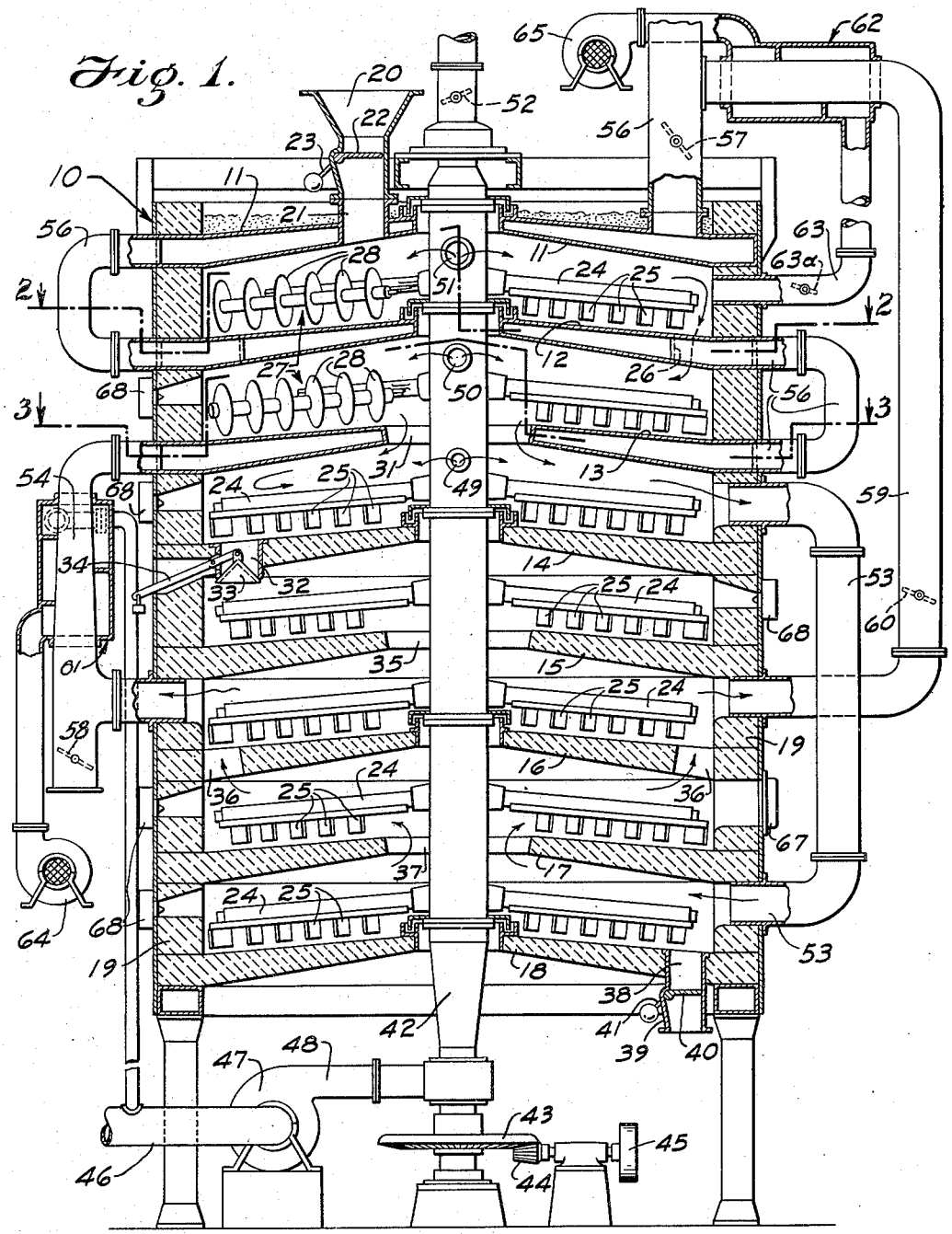
Fig. 1 is a sectional view of which the left-hand part is a section along line 1—1 of Fig. 2 and the right-hand side is a section along the line 1a—1a of Fig. 2.
Figure 2:
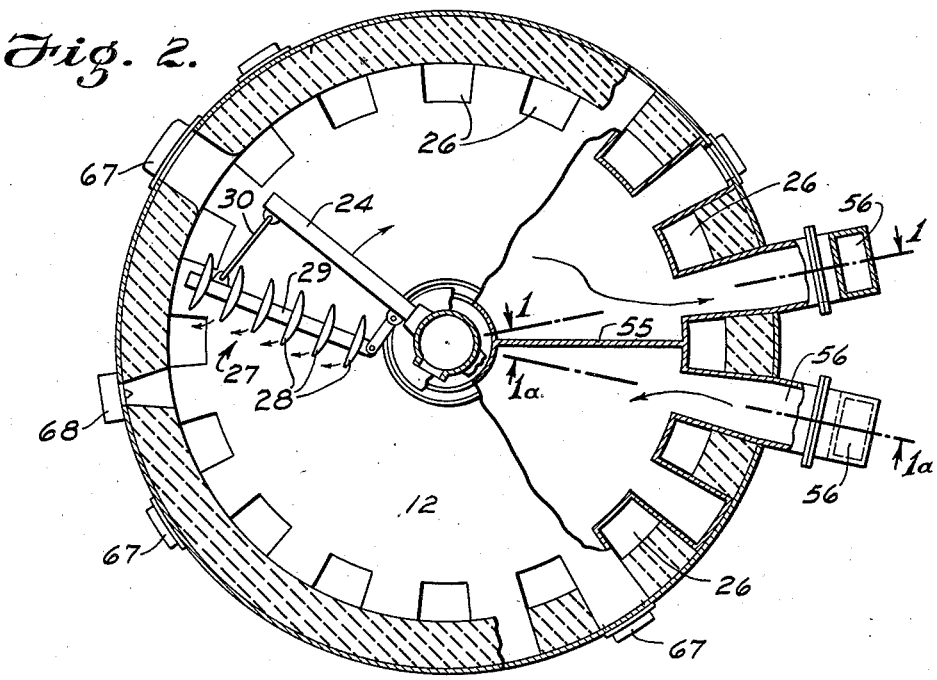
Fig. 2 is a section taken on the line 2—2 of Fig. 1.
Figure 3:
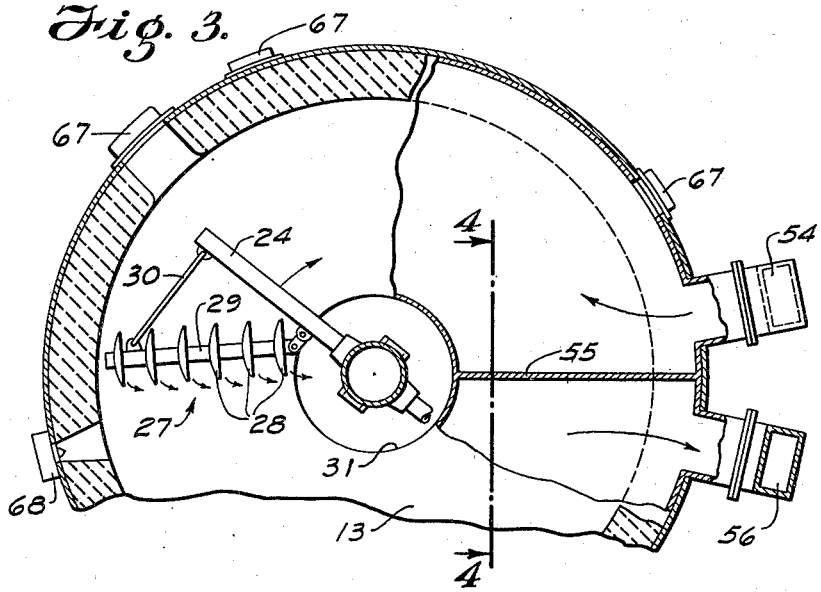
Fig. 3 is a section taken on the line 3—3 of Fig. 1.
Figure 4:
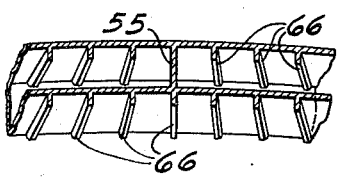
Fig. 4 is a section taken on the line 4—4 of Fig. 3.

Referring to the drawings, the invention may be embodied in a tiered multiple-hearth furnace 10 having a top 11, hearths 12, 13, 14, 15, 16, 17 and 18, and a peripheral wall 19 in which the top and the hearths, including the lowermost hearth or bottom 18, are supported. The material to be treated, which may include solids with a substantial water content and containing volatile material, may be introduced into the furnace and deposited upon the uppermost hearth 12, through a hopper 20 and chute 21 extending through the top 11 of the furnace and provided with a pivoted door or gate 22 normally held in closed position by a weighted arm 23. As soon as a sufficient amount of material to overcome the weight of the weighted arm 23 collects on the door or gate 22, the door swings downwardly about its pivotal support and the material on the door falls to the hearth 12. As illustrated the material introduced through the chute 21 falls on the hearth 12 near the center thereof and is worked outwardly by suitable rabbling means including a radial arm 24 carrying inclined blades 25 adapted to work material on the hearth 12 outwardly toward outlets 26 and a stirring or agitating device 27 comprising a plurality of discs 28 rotatable on a member 29 inclined with respect to a radial arm as illustrated in Fig. 3. The inner end of the shaft 29 may be pivotally connected with a radial arm 24 and at its outer end may be connected with the radial arm 24 by means of a link 30. The material falling through the outlets or discharge openings 26 of the hearth 12 is deposited upon a hearth 13 near its periphery and is agitated and worked inwardly to a central discharge opening 31 by means of a rabbling and stirring device similar to those used above hearth 12. From the hearth 13 the material drops to the central portion of the hearth 14 where it may be worked outwardly to an outlet 32 by means of rabbling devices such as those comprising radial arms and inclined blades 25. This hearth 14 is used to divide the furnace into an upper drying section and a lower burning section. Preferably there is only one outlet 32 which is closed by a valve member 33 normally held in raised closed position by means of a weighted arm 34. Below the hearth 14 the rabbling devices each of which comprise a radial arm 24, and inclined blades 25, serve to move the material inwardly to a central outlet 35 and then outwardly on hearths 16 to peripheral openings 36. The materials at the outlets 36 of the hearth 16 drop to the periphery of the hearth 17 and are gradually worked into a central opening 37 through which they fall to the central portion of the lowermost hearth or bottom 18 of the furnace. From the central part of the hearth 18 the material is worked outwardly to a discharge or outlet 38 provided with a chute 39 having a pivoted door 40 normally held in closed position by means of a weighted arm 41.

All of the rabbling and agitating devices are driven by a hollow central shaft 42 extending upwardly along the axis of the furnace. The shaft 42 may be driven by any suitable means, which for example may include a bevel gear 43 at the lower end of the shaft, a bevel gear 44 meshing with the bevel gear 43, and a pulley 45 operable from any suitable source of power and directly connected with the bevel gear 44. As heretofore air may be introduced into the hollow shaft 42 through a pipe 46 leading to a fan 47 which discharges through a duct 48 to the lower end of the cylinder 42. The air supplied by the fan 47 passes upwardly through the shaft 42 and acts not only to cool the shaft 42, but, in the present instance, is preheated to some extent in passing upwardly through the lower compartments of the furnace so that it may be discharged as preheated air into the upper hearths of the furnace through openings 49, 50 and 51 over the hearths 14, 13 and 12 respectively. Some of the air introduced into the hollow shaft 42 may pass out of the upper end of the hollow shaft 42, to any suitable place, the amount discharged being controlled by means of the damper 52.

It is desirable to discharge equal amounts of air through the openings 49, 50 and 51 and for this purpose the lower opening 49 is the smallest, the opening 50 is larger than the opening 49, and the opening 51 is larger than the opening 50. The air introduced through the openings 49, 50 and 51, together with moisture vapor and volatile matter picked up in the heated drier section, is discharged from the lowermost zone of the drying section into a duct 53 communicating with the interior of the lower or burning section, preferably in the lowermost zone of the burning section. In the burning section the air and vapors from the drying zone are passed back and forth over hearths of the burning section and upwardly from one zone to another. During this movement the oxygen of the air assists in maintaining combustion in the burning section and the temperature in the burning section is sufficient to eliminate noxious odors in the air and gases introduced from the drying zone.

In order to produce the desired drying and vaporizing action in the upper or drying section of the furnace, gases of combustion from the compartment over the hearth 16 are discharged through an upwardly extending duct 54 to the lowermost hollow hearth 13 of the drying section. In this hearth the hot gases are passed completely around the central portion due to a partition 55 in the compartment and are taken out at the opposite side of the partition 55 through a duct 56 from which they pass to the next higher hearth 12 where the general flow of gases is repeated. From the hearth 12, the partially cooled gases of combustion are passed into the top 11 which is constructed similarly to the other hearths and is finally discharged into a flue 56a controlled by a damper 57. In order to prevent excessive heating in the drying section, the duct or pipe 54 may be provided at its bottom with a damper 58 to control the admission of cold air. Not all of the hot gases of combustion from the burning section can be discharged through the pipe 54 leading to the hearths of the drying zone. The remaining portion of the hot gases of combustion may then be discharged through a pipe or duct 59 controlled by damper 60 to the flue 56a leading to the stack.

In view of the fact that the top 11 is hollow and hot gases are passed therethrough to the flue 56a, it may be desirable to insulate the top from the outside air as by placing sand thereon or to dry the material to be burned, on the top 11, before placing it in the hopper 20.

Although the structure already described is sufficient to produce effective operation it may be desirable to provide the ducts 54 and 59 with heat exchangers 61 and 62 respectively, and to utilize the air thus preheated by introducing it into the furnace at any desired part, for example, the uppermost compartment or zone through the duct 63, controlled by the damper 63a. Air may be supplied to the heat exchangers 61 and 62 by fans 64 and 65, respectively. Air from the preheater 61 and 62 may also be supplied to duct 46 which supplies air for the hollow shaft 42.

It will be evident that in the drying section, the air or gas flow is in general concurrent with the flow of material and that in the burning section the flow of gases is countercurrent to the flow of solids except in the uppermost compartment in which it is both concurrent with and countercurrent to the flow of solids.

Preferably the upper and lower plates of each hollow hearth are provided with ribs 66 to assist the heat exchanging action.

The furnace may also be provided with suitable doors 67 and burners 68 at any zones or compartments where it is desired.

In putting the furnace into operation, use may be made of one or more burners to raise the furnace to the proper temperature, and the wet solids may be fed into the furnace directly or after drying on the hollow top or hearth 11. Frequently the sewage solids are dewatered as by filtration before being fed to the furnace. After the furnace is properly started, some or all of the burners 68 may be turned off. The material may still have a considerable moisture content and, when it is heated on the hollow metal hearths, may tend to cake on the hollow hearths. To avoid difficulties due to their tendency to cake, there are provided rotary discs 27 which serve to break up the caked material and enable the usual rabbling of the material over the hearths to their outlets. Air for drying and the support of combustion may be introduced into the lower end of the hollow shaft 42 by means of the fan 47 and discharged wholly or partially into the compartments of the drying section through the openings 49, 50 and 51. The amount of air discharged into the drying section may depend to a great extent upon the positioning of the damper 52 at the upper end of the hollow shaft 42.

The air thus introduced into the drying section is drawn out, laden with gases and vapors, at the bottom of the drying section and passed through the duct 53 to the lowermost compartment or zone of the burning section. The temperature in the burning section is high enough to eliminate all odors and the gases of combustion flowing to the upper part of the burning section are discharged from the next to top compartment either through the duct 54 leading to the hollow hearths in the drying section or through the duct 59 under control of the damper 60 to the stack 56. As already stated the compartment between the hearths 14 and 15 has no other inlet nor outlet than the central opening 35 through which the gases pass into and out of this compartment.

The temperature of the gases passing into the hollow hearths may be kept from getting too high by opening the damper 58.

If desired, air may be preheated by means of the heat-exchangers 61 and 62 and used to preheat air introduced into the central shaft 42 and through duct 63, controlled by the damper 63a, into the upper part of the drying section.

It should be understood that various changes should be made and that certain features may be used without others, without departing from the true scope and spirit of the invention.

Having thus described my invention, I claim:

1. Apparatus of the class described comprising a tiered multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means for supplying air to the drying section, means for conducting gases and vapors from the drying section to the burning section, and means for conducting hot exhaust gases of combustion from the burning section through the hollow hearths of the drying section for heating the material and gases passing through the drying section.

2. Apparatus of the class described comprising a tiered multiple-hearth furnace having a plurality of vertically spaced hearths extending across the furnace to divide it into compartments and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means for conducting gases and vapors from the drying section to the burning section, means for conducting hot exhaust gases of combustion from the burning section through the hollow hearths of the drying section for heating the solids and gases therein, and rabbling means for feeding the material over said hearths to their outlets, said rabbling means including a hollow vertical shaft receiving air at its lower end and having suitable openings to supply air to the compartments of the drying section.

3. Apparatus of the class described comprising a multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means conducting gases and vapors from the drying section to the burning section, means for conducting hot exhaust gases of combustion from the burning section through the hollow hearths of the drying section before discharge from the furnace, and means for discharging from the furnace hot exhaust gases of combustion in the burning section.

4. Apparatus of the class described comprising a tiered multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means conducting gases and vapors from the drying section to the burning section, a duct for conducting hot exhaust gases of combustion from the burning zone to the hollow hearths of the drying section, and means for introducing air into said duct.

5. Apparatus of the class described comprising a tiered multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, each of said hearths having a radial partition and an inlet and an outlet on opposite sides of the partition, means for supplying air to the drying section, means for conducting gases and vapors from the drying section to the burning section, and means for supplying hot gases of combustion in said burning section to the inlets of said hollow hearths.

6. Apparatus of the class described comprising a tiered multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, the hollow hearths of said drying section being connected in series, means for conducting gases and vapors from the drying section to the burning section, and means for supplying hot gases of combustion in said burning section to the lowermost of said hollow hearths.

7. Apparatus of the class described comprising a tiered multiple-hearth furnace having a plurality of vertically spaced hearths extending across the furnace to divide it into compartments and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means for conducting gases and vapors from the drying section to the burning section, means for conducting hot exhaust gases of combustion from the burning section through the hollow hearths of the drying section for heating the solids and gases therein, and rabbling means for said hearths including for said hollow hearths rotary-disc devices for breaking up caked material.

8. Apparatus of the class described comprising a tiered multiple-hearth furnace having a plurality of vertically spaced hearths extending across the furnace to divide it into compartments and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means conducting gases and vapors from the drying section to the burning section, means for conducting hot exhaust gases of combustion from the burning section through the hollow hearths of the drying section for heating the solids and gases therein, rabbling means cooperating with material on said hearths and including a hollow shaft receiving air at its lower end and supplying air to the compartments of the drying section, and means for preheating air supplied to the hollow shaft by heat interchange with exhaust gases from the burning section.

9. Apparatus for treating material which comprises means for passing the material downwardly from zone to zone through a plurality of superposed zones, means for retaining the material temporarily in each zone, means for preventing the direct flow of gases between an upper drying group of zones and a lower burning group of zones, means for preheating air by bringing it into heat exchanging relationship with hot gases in the burning group, means for passing the air thus preheated into the zones of said drying group, means for heating the material and gases in the drying group of zones by bringing into heat interchanging relationship therewith hot gaseous products passing from the burning group of zones to the atmosphere, and means for passing gases and vapors from the drying group of zones to the burning group of zones.

GEO. R. LEWERS.

DISCLAIMER 2,117,487.—*George R. Lewers*, Brooklyn, N. Y. INCINERATION. Patent dated May 17, 1938. Disclaimer filed July 6, 1939, by the assignee, *Underpinning & Foundation Company, Inc.*

Hereby enters this disclaimer to claims 1, 2, 3, 6, and 9 in said specification.

[*Official Gazette July 25, 1939.*]